United States Patent [19]
Wayne

[11] 4,380,073
[45] Apr. 12, 1983

[54] INJECTION CONTROL OF AN ELECTRO-OPTICALLY Q-SWITCHED CAVITY-DUMPED LASER

[75] Inventor: Robert J. Wayne, Glastonbury, Conn.

[73] Assignee: United Technologies Corporation, Hartford, Conn.

[21] Appl. No.: 205,812

[22] Filed: Nov. 10, 1980

[51] Int. Cl.$^3$ ............................ H01S 3/10; H01S 3/13
[52] U.S. Cl. ........................................ 372/12; 372/25; 372/30
[58] Field of Search ................... 372/9, 10, 12, 18, 29, 372/106, 108, 30, 32, 25

[56] References Cited

U.S. PATENT DOCUMENTS 4,176,327  11/1979  Wayne et al. ......................... 372/12

OTHER PUBLICATIONS

Zubarev et al., "External-Signal Control of the Emission Spectrum of a Q-Switched Neodymium Laser", Sov. J. Quantum Electron., (USA), vol. 4, No. 3, Sep. 1974, pp. 348–350.

*Primary Examiner*—James W. Davie
*Attorney, Agent, or Firm*—Eric W. Petraske

[57] ABSTRACT

An electro-optically Q-switched cavity-dumped laser is improved by the addition of an injection control laser, so that time jitter is reduced, frequency stability is improved, higher peak circulating power in the Q-switch pulse is achieved, an intracavity grating is no longer required.

3 Claims, 2 Drawing Figures

FIG. I

INJECTION CONTROL OF AN ELECTRO-OPTICALLY Q-SWITCHED CAVITY-DUMPED LASER

DESCRIPTION

1. Technical Field

The technical field to which the invention relates is the achievement of pulsed lasers by Q switching.

2. Background Art

The laser system to which the subject invention is an improvement is described in U.S. Pat. No. 4,176,327, issued on Nov. 27, 1979 and incorporated herein by reference. That patent discloses an electro-optically Q-switched, cavity-dumped laser in which a polarization coupler couples out of the cavity radiation of a certain polarization. A pulse applied to an electro-optic modulator converts the cavity radiation to a polarization that is retained in the cavity, resulting in a pulse build-up having a certain rise time. The voltage on the electro-optic modulator is reduced with a certain fall time, during which the built-up radiation is coupled out of the cavity. Wavelength control is provided by an intracavity grating.

Injection control of other types of lasers is known in the prior art to have undesirable properties. For example, injection control of cw oscillating lasers strongly affects the gain. Injection control of a gain-switched transmitter such as a TEA laser (La Chambre, IEEE Journal of Quantum Electronics, Vol. QE-12, December 1976, pp. 756-764), of a passively Q-switched transmitter having a saturable absorber (Buczek, Proceedings IEEE, Vol. 61, October 1973, pp. 1411-1431), or of a mechanically Q-switched transmitter (Hirose, JJAP, Vol. 16, January 1977, pp. 111-116) has the undesirable feature that the peak power of the pulse is reduced or that the repetition rate is affected through recovery dynamics.

DISCLOSURE OF THE INVENTION

The invention relates to the injection control of an electro-optically Q-switched laser transmitter by means of injecting a stable low power cw laser beam into a wavelength and frequency non-selective optical cavity.

The foregoing and other objects, features and advantages of the present invention will become more apparent from the following description of preferred embodiments and accompanying drawings.

BEST MODE FOR CARRYING OUT THE INVENTION

Figure 1:
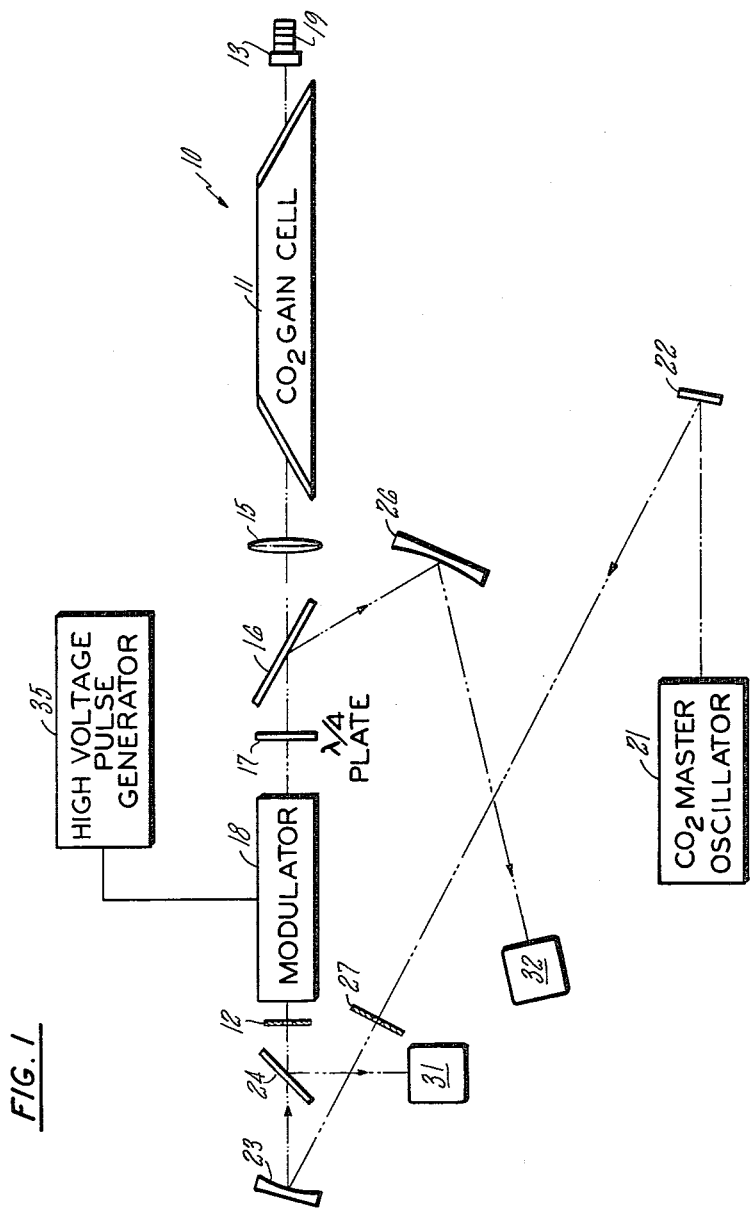
FIG. 1 illustrates a laser transmitter embodiment of the invention.

In FIG. 1, laser 10 includes gain cell 11 having Brewster angle windows, coupling lens 15, mirrors 12 and 13, electro-optic modulator 18, quarter wave plate 17 and polarization coupler 16. Coupler 16, illustratively a high index material such as GaAs, is oriented at Brewster's angle so that only radiation polarized in the plane of the paper passes through the coupler, while the polarization component perpendicular to the paper is deflected out of the optical cavity.

As explained in the previous U.S. Pat. No. 4,176,327, the normal state of the system prevents self-oscillation because radiation passing from grain medium 11 through coupler 16 is polarization rotated 90° while passing twice through quarter wave plate 17 and is thus deflected out of the cavity. In pulsed operation, pulser 35 applies a voltage across modulator 18, illustratively a CdTe crystal, to cancel out the effect of plate 17. The cavity is thus switched from a high loss mode to a low loss mode during the pulse so that radiation can build up in the cavity after a certain delay time and with a certain rise time and time jitter, the jitter being caused essentially by fluctuations in the spontaneous generation caused by pulse-to-pulse variations in the cavity length and hence in the gain.

Figure 2:
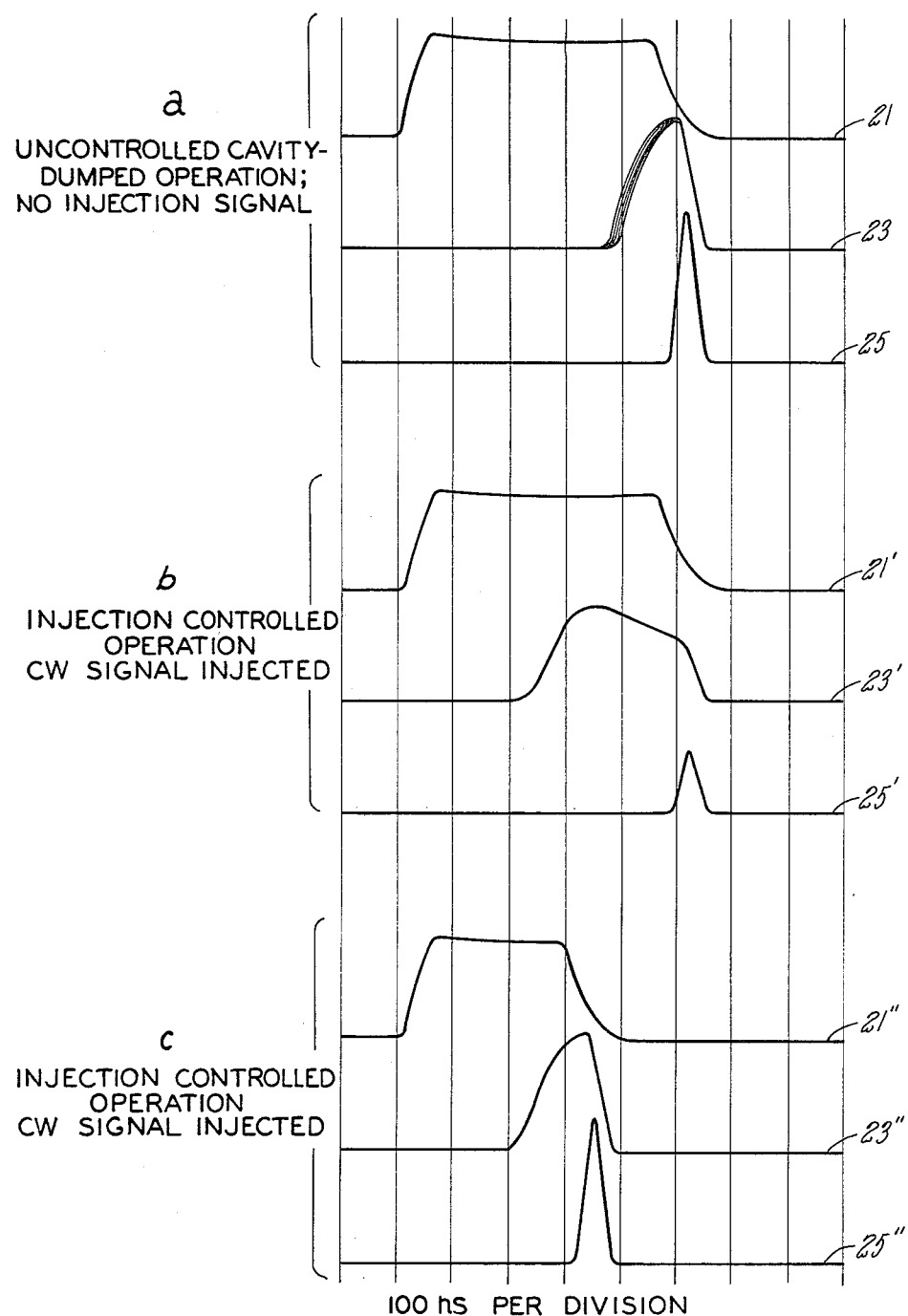
FIG. 2 illustrates the relationship between electro-optic modulator pulse, intracavity radiation and output radiation.

These parameters may be measured by mirror 26 and detector 32, which respond to the cavity-dumped output pulse and by beam splitter 24, which deflects radiation emerging through mirror 12 and directs the radiation to detector 31. Results of the measurement are shown in FIG. 2a, in which trace 21 shows the voltage applied to modulator 18, trace 23 shows the intracavity power with a delay of approximately 500 nanoseconds and a substantial time jitter and trace 25 shows the output power, which has a pulse duration dependent on the fall time of the modulator pulse.

Lasers of different types have been injection controlled by other workers, with results that have been undesirable for applications involving a pulsed laser transmitter. In particular, injection control of a TEA gain-switched transmitter, a passively Q-switched transmitter or a mechanically Q-switched transmitter has resulted in a decrease in the peak power or in the pulse repetition rate caused by an increase in recovery time, both of which effects are significant drawbacks.

It has been found that injection control of an electro-optically modulated Q-switched cavity dumped laser transmitter avoids the adverse effects mentioned above while effectively eliminating time jitter, and greatly improving pulse-to-pulse frequency stability, reducing the pulse build-up period and the required modulator power by a factor of two or more, permitting the suppression of self-oscillation by control of the modulator pulse width and permitting the elimination of an intracavity grating for frequency control. In operation, cw oscillator 21 produces a stable, frequency-controlled beam that is reflected by mirrors 22 and 23 through beam splitter 24 and mirror 12 into the optical cavity. The injected beam does not deplete the population inversion between pulses as other forms of injection control do, because of the high loss mode of operation. As a result, when the Q-switch is energized, both the population inversion and the intracavity photon density are very high simultaneously. The intracavity pulse builds up from the relatively high level of the injected beam, rather than from spontaneous emission noise so that the time to build up is reduced and the time jitter is eliminated, since pulse-to-pulse gain variations are insignificant. FIG. 2b illustrates the same three traces as FIG. 2a. It can be seen in trace 23b that the pulse build-up delay is much reduced and the time jitter is eliminated.

Since there is no point in delaying the output switch after the maximum power level is reached, it is possible to shorten the modulator pulse, thus reducing the power required and permitting an increase in the repetition rate for the same modulator power, if desired. FIG. 2c illustrates the same parameters with a shortened modulator pulse. The circulating power builds up rapidly and is dumped with the same peak power as the uncontrolled embodiment of FIG. 2a.

An advantageous effect of shortening the modulator pulse is the suppression of uncontrolled oscillations. The modulator pulse terminates before spontaneous emission can build a pulse out of the noise, so that the cavity is able to oscillate only on the injected line. This feature simultaneously eliminates problems of spontaneously generated oscillation competing with the injected signal for the population inversion and also permits the removal of the intracavity grating of the prior embodiment, thus increasing the output power capability of the transmitter. Without the grating, the transmitter frequency may be controlled by control of the low-power cw oscillator frequency and adjusting the cavity length accordingly with adjusting device 19, illustratively a PZT device.

Although this invention has been shown and described with respect to a preferred embodiment, it will be understood by those skilled in this art that various changes in form and detail thereof may be made without departing from the spirit and scope of the claimed invention.

I claim:

1. An apparatus for generating pulses of optical radiation comprising:

an electrically pumped gaseous optical gain medium;

electrical pumping means for building a population inversion within said gain medium;

a pair of reflective elements bracketing said gain medium and defining an optical cavity having an optic axis therethrough;

a polarization coupling means positioned along said optic axis intermediate said gain medium and one of said reflective elements and oriented at a predetermined angle with respect to said optic axis, whereby said coupling means couples out of said cavity radiation of a first linear polarization and passes radiation of a second polarization orthogonal to said first polarization;

phase retardation means and electro-optical polarization modulation means disposed intermediate said polarization coupling means and said one of said reflective elements;

means for applying an electrical pulse of predetermined voltage, rise time, duration and fall time to said polarization modulation means; and continuous wave laser means for injecting a control beam of optical radiation into said optical cavity, whereby said cavity is Q switched by said polarization modulation means to build up intracavity electromagnetic radiation during said rise time and duration, which radiation is coupled out of said cavity by said polarization coupling means during said fall time.

2. An apparatus according to claim 1, in which said optical cavity has a broad band frequency response and in which said predetermined pulse rise time and duration are less than the time required for self-oscillation buildup of radiation in said cavity.

3. An apparatus according to claim 2, in which said control beam is substantially monochromatic and continuous wave.

* * * * *